US011932432B1

(12) United States Patent
Bausch et al.

(10) Patent No.: US 11,932,432 B1
(45) Date of Patent: Mar. 19, 2024

(54) SYSTEM AND METHOD FOR FILLING CARTRIDGES

(71) Applicant: Bausch Advanced Technologies Inc., Clinton, CT (US)

(72) Inventors: Oliver Bausch, Clinton, CT (US); Mirzet Kamic, Clinton, CT (US); Maximilian Rothenbuecher, Clinton, CT (US)

(73) Assignee: Bausch Advanced Technologies Inc., Clinton, CT (US)

( * ) Notice: Subject to any disclaimer, the term of this patent is extended or adjusted under 35 U.S.C. 154(b) by 0 days.

(21) Appl. No.: 18/191,239

(22) Filed: Mar. 28, 2023

(51) Int. Cl.

| | |
|---|---|
| ***B65B 3/12*** | (2006.01) |
| ***B65B 3/14*** | (2006.01) |
| ***B65B 63/08*** | (2006.01) |
| ***B67C 3/26*** | (2006.01) |

(52) U.S. Cl.
CPC .................. *B65B 3/12* (2013.01); *B65B 3/14* (2013.01); *B65B 63/08* (2013.01); *B67C 3/26* (2013.01)

(58) Field of Classification Search
CPC .. B65B 3/12; B65B 3/14; B65B 63/08; B67C 3/26
USPC .............................................................. 141/2
See application file for complete search history.

(56) References Cited

U.S. PATENT DOCUMENTS

| | | | | |
|---|---|---|---|---|
| 4,142,561 A * | 3/1979 | Bennett | B65B 63/08 141/82 |
| 4,341,329 A * | 7/1982 | Kuemmerer | G01F 11/38 222/380 |
| 6,733,256 B1 * | 5/2004 | Knobel | A23G 3/2023 417/462 |
| 7,621,427 B2 * | 11/2009 | Monti | B65B 25/00 222/363 |
| 7,708,535 B2 * | 5/2010 | Peeler | F04B 49/12 417/500 |
| 10,583,949 B1 * | 3/2020 | Ellis | B65B 3/12 |
| 2015/0336689 A1 * | 11/2015 | Brown | G07F 13/06 141/370 |
| 2017/0121169 A1 * | 5/2017 | Dailey | B65B 57/145 |
| 2018/0170588 A1 * | 6/2018 | Boldrini | A24F 40/70 |
| 2020/0216331 A1 * | 7/2020 | Jeon | C02F 1/325 |
| 2021/0137173 A1 * | 5/2021 | Gardella | B65B 29/00 |
| 2021/0171231 A1 * | 6/2021 | Bumatai | B65B 3/12 |
| 2023/0121014 A1 * | 4/2023 | Joseph | B65B 3/32 53/467 |
| 2023/0174257 A1 * | 6/2023 | Scafaria | A24F 40/42 141/1 |

OTHER PUBLICATIONS

Metering Pumps, IQS Directory, May 17, 2022 [retrieved on Jun. 27, 2023. Retrieved from the Internet URL: https://web.archive.org/web/20220517145437/https://www.iqsdirectory.com/articles/metering-pump.html] (Year: 2022).*

* cited by examiner

*Primary Examiner* — Timothy P. Kelly
*Assistant Examiner* — Stephanie A Shrieves
(74) *Attorney, Agent, or Firm* — Nathan & Associates; Menachem Nathan

(57) ABSTRACT

A system and method of use of the system, the system including: a tank configured to store a fluid; a positive displacement pump in fluid communication with the tank; and a filling needle in fluid communication with the pump and configured to form a releasable sealed attachment to a cartridge; wherein the pump is configured to pump measured doses of the fluid received from the tank through the needle into the cartridge.

31 Claims, 11 Drawing Sheets

SYSTEM AND METHOD FOR FILLING CARTRIDGES

FIELD

Embodiments disclosed herein relate generally to systems and methods for automated filling of cartridges and more specifically for accurate repeatable filling of cartridges with a material having an oily viscosity.

INTRODUCTION

Electronic cigarettes may vaporize an "e-liquid" or "vaping fluid" that may be stored in a cartridge (vaping cartridge) attached to or within the cigarette. Since the vaping fluid typically has an oily viscosity, the filling of the cartridges during manufacture may raise technical problems, as manufacturing facilities aim to fill multiple cartridges per minute.

One such problem is related to the viscosity of the vaping fluid that must evenly fill a cartridge within a short period of time (e.g., a few seconds), a procedure that requires quickly moving an oily vaping fluid that may be naturally resistant to flow. Further, current approaches to measurement of the "dosage" of vaping fluid per cartridge may lead to inconsistent dosages per cartridge. For example, one approach relies on a pinch valve that opens and closes at intervals determined based on the pressure of the vaping fluid supplied to the valve and the desired dosage, without actually measuring the volume of fluid provided to the cartridge.

It would therefore be desirable to provide a system capable of automatically and repeatedly filling cartridges with an accurate volume of a fluid having an oily viscosity.

SUMMARY

Embodiments disclosed herein provide for systems and methods that may automatically and repeatedly fill cartridges with an accurate volume of a fluid having an oily viscosity. Advantageously the system disclosed herein may provide for heating the fluid prior to filling and along the flow of the fluid towards being filled in a cartridge to thereby increase the viscosity and ease the handling and filling accuracy of the fluid.

Further advantageously the system disclosed herein may use a positive displacement pump (or simply "pump") that may result in repeatable and accurate dosages delivered by the pump towards a filling needle (or simply "needle") and subsequently to cartridges for ensuring repeatable accurate filling of the cartridges with a determined measure of the fluid.

Further advantageously, needle dispensing outlets within a disclosed filling needle may be kidney-shaped and positioned around a circumference of a needle alignment shaft and may evenly distribute fluid between the walls of the cartridge casing and a center post of the cartridge as fluid is injected into the cartridge to thereby prevent fluid from accumulating on one side of the cartridge. The needle alignment shaft may ensure accurate alignment of the disclosed filling needle with cartridges to ensure sealing of the filling needle against the cartridge so that the fluid may be accurately dispensed with no spillage. The filling needle may be configured to form a releasable sealed attachment to a cartridge to be filled such as by including an outer seal that engages with the walls of the cartridge when the filling needle is pushed against the cartridge.

Consistent with disclosed embodiments, a cartridge filling system, includes: a tank configured to store a fluid; a pump in fluid communication with the tank; and a filling needle in fluid communication with the pump and configured to form a releasable seal to a cartridge, wherein the pump is configured to pump measured doses of the fluid received from the tank through the filing needle into the cartridge, and wherein the pump is a positive displacement pump.

In some embodiments, the fluid is a vaping fluid and the cartridge is a vaping cartridge. In some embodiments, the tank includes a heater configured to heat the fluid inside the tank to a desired temperature range and/or desired viscosity. In some embodiments, the desired temperature range is between 120 and 160° F. In some embodiments, the tank includes a temperature sensor positioned so as to sense the temperature of the fluid. In some embodiments, the tank includes a temperature sensor positioned so as to sense the temperature of the tank.

In some embodiments, the heating by the heater reduces the viscosity of the fluid by between 80%-95%. In some embodiments, the tank is configured to apply pneumatic pressure to the fluid inside the tank to thereby force the fluid out of the tank. In some embodiments, the tank includes a level sensor configured to sense when the fluid in the tank drops below a defined level.

In some embodiments, a portion of the pump and tubing connected to the pump is enclosed within a heating box that is configured to maintain the temperature of the fluid within the pump and the tubing at a desired range. In some embodiments, the desired temperature range is between 120 and 160° F. In some embodiments, the heating box includes a metal box and a blower heater.

In some embodiments, the positive displacement pump is a reciprocating positive displacement pump. In some embodiments, the positive displacement pump is a valveless piston reciprocating positive displacement pump. In some embodiments, the pump includes a piston having a notch portion that is alternately aligned with an inlet port or outlet port of the pump.

In some embodiments, the cartridge includes a center post that is hollow and the filling needle includes a needle alignment shaft configured to fit into the center post to thereby align the filling needle with the cartridge. In some embodiments, the filling needle is mounted on a linear shaft configured to drive the filling needle into the cartridge so that a seal is achieved between the filling needle and the cartridge. In some embodiments, the filling needle includes an outer seal configured to engage with the cartridge to thereby seal the cartridge for when the fluid is injected into the cartridge. In some embodiments, the filling needle includes needle dispensing outlets positioned around a circumference of the needle alignment shaft such that the fluid injected into the cartridge through the needle dispensing outlets is evenly distributed around the cartridge.

In some embodiments, the system further includes a controller configured to operate the system. In some embodiments, the system further includes a human machine interface for interaction of a user with the controller. In some embodiments, the system further includes a lid attachment robot configured to attach lids onto cartridges that have been filled with fluid. In some embodiments, the system further includes a tray bay configured to hold trays filled with empty cartridges, caps, and cartridges that have been filled and capped. In some embodiments, the system further includes a star wheel configured to move trays of empty cartridges, caps, filled cartridges and cartridges that have been filled and capped. In some embodiments, the system further includes a robot arm configured to pick and place empty cartridges and caps from the tray bay into the star wheel and cartridges that have been filled and capped from the star wheel into the tray bay.

Consistent with disclosed embodiments, a method for filling a cartridge includes: providing a cartridge filling system including a tank configured to store a fluid, a pump in fluid communication with the tank, and a filling needle in fluid communication with the pump and configured to form a releasable seal to a cartridge, wherein the pump is a positive displacement pump; causing the filling needle to engage with a cartridge; and activating the pump to pump a measured dose of the fluid received from the tank through the filing needle into the cartridge.

In some embodiments, the fluid is a vaping fluid and the cartridge is a vaping cartridge. In some embodiments, the method further includes heating the fluid in the tank and in the pump to a desired temperature range and/or desired viscosity. In some embodiments, the desired temperature range is between 120 and 160° F. In some embodiments, the heating reduces the viscosity of the fluid by between 80%-95%. In some embodiments, the method further includes applying pneumatic pressure to the fluid inside the tank to thereby force the fluid out of the tank.

In some embodiments, the cartridge filling system further includes a controller configured to operate the cartridge filling system, and a human machine interface (HMI) for interaction of a user with the controller, and wherein the method further includes interacting with the HMI to set the desired temperature range and/or desired viscosity and/or a volume of the measured dose of fluid to be injected into the cartridge and/or a flow rate of fluid out of the tank.

This Summary is provided to introduce a selection of concepts in a simplified form that are further described in the Detailed Description below. It may be understood that this Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein and should not be considered limiting in any way. Like elements in different drawings may be indicated by like numerals. Elements in the drawings are not necessarily drawn to scale.

DETAILED DESCRIPTION

Figure 1A:
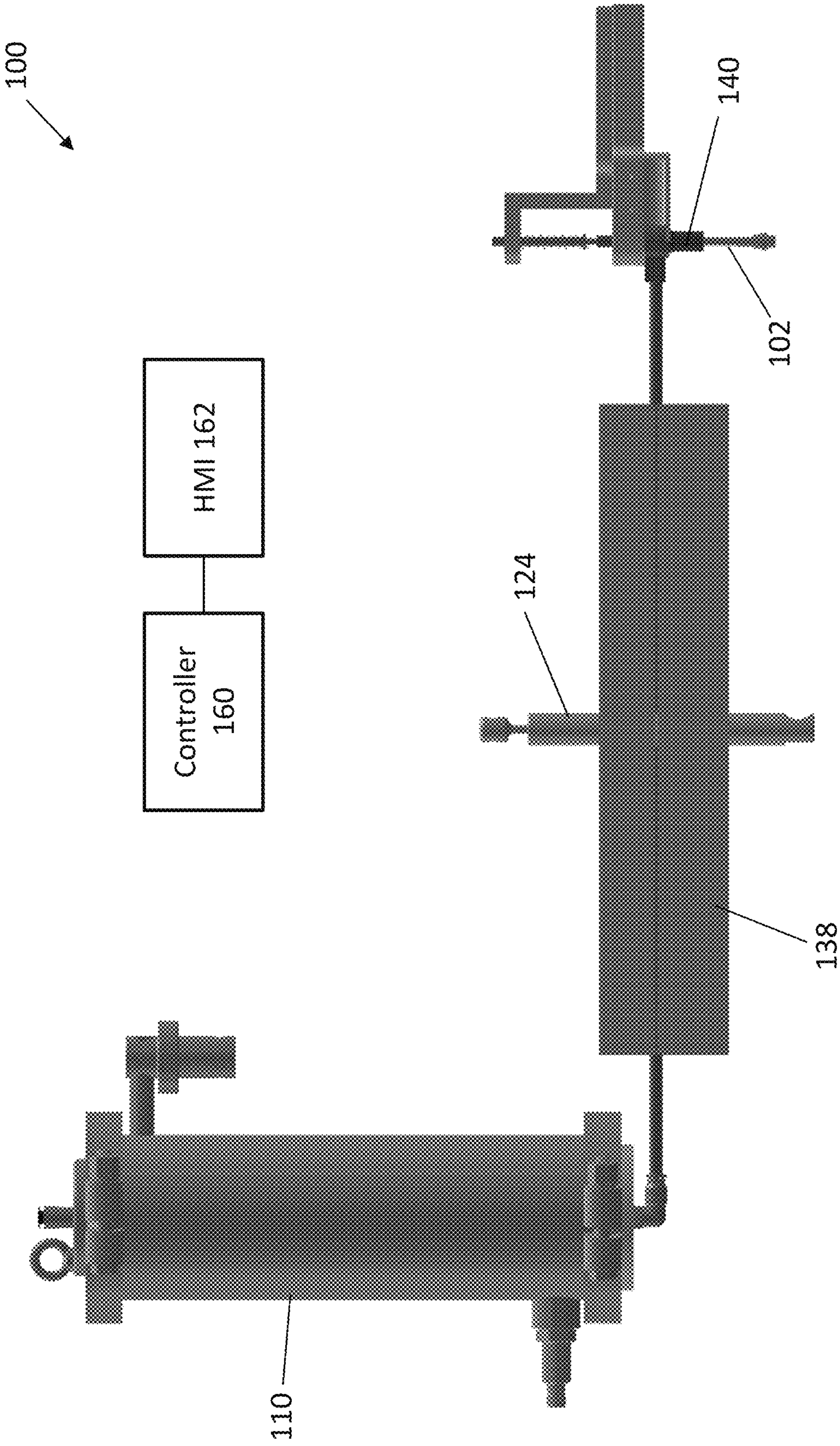
FIG. 1A shows a drawing of a system for filling cartridges according to some implementations.
Figure 1B:
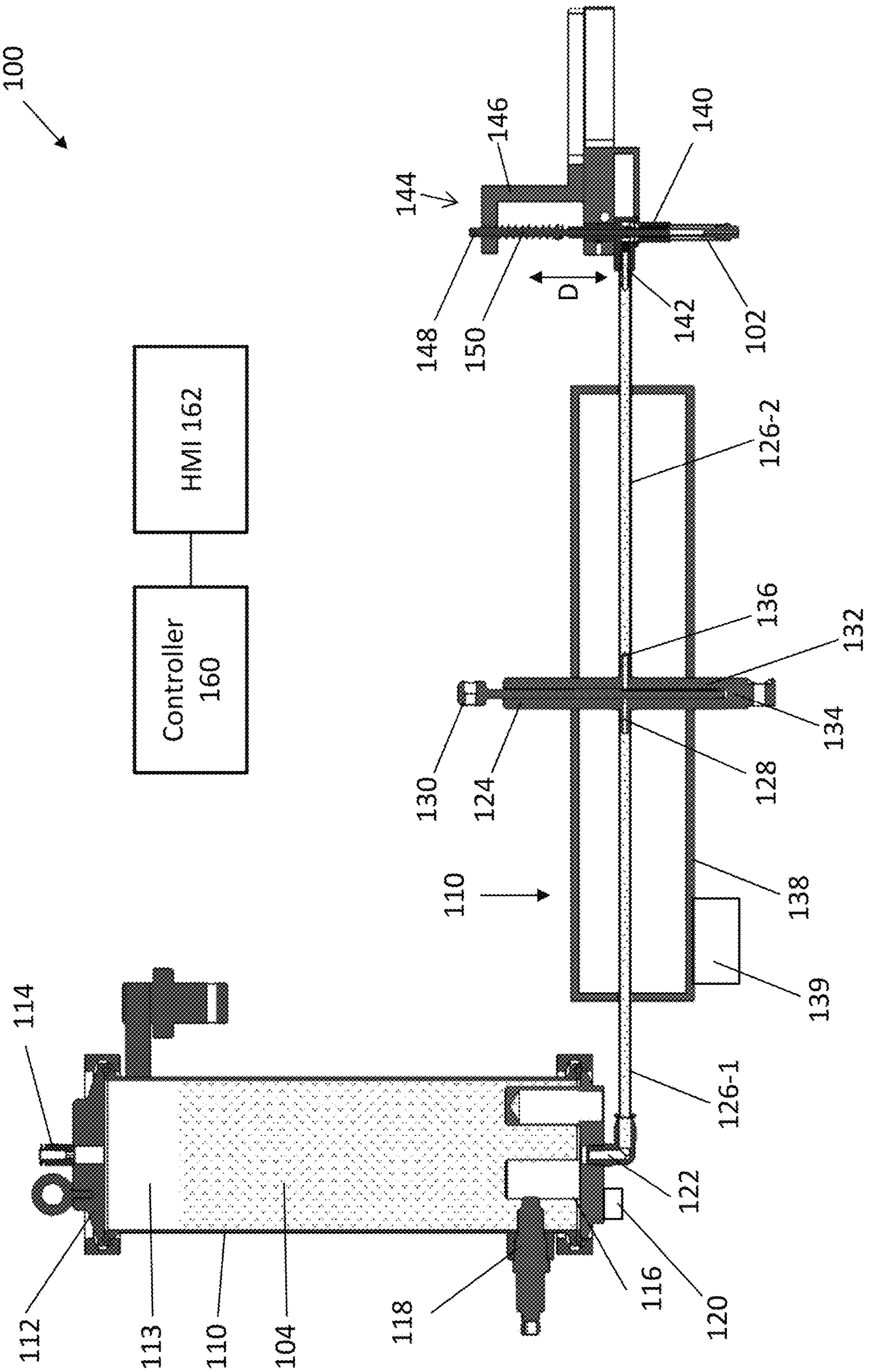
FIG. 1B shows a cutaway drawing of a system for filling cartridges according to some implementations.

Embodiments disclosed herein provide for systems and methods that may automatically and repeatedly fill cartridges with an accurate volume of a fluid having an oily viscosity. FIG. 1A illustrates a system 100 for filling cartridges according to some implementations. FIG. 1A shows the primary components of system 100 including storage and filling tank 110, pump 126, heater box 138, filling needle 140, and controller 160. FIGS. 1B-1H show cutaway drawings of parts of system 100, each of which will be described further below.

In some embodiments, system 100 may be configured to fill cartridges 102 with a fluid 104. In some embodiments, cartridges 102 may be "vaping cartridges" configured for use in electronic cigarettes. An electronic cigarette may include an atomizer, a power source such as a battery, and a replaceable container for vaping fluid such as a cartridge. In some embodiments, fluid 104 may be a vaping fluid used in an electronic cigarette. In some embodiments, fluid 104 may have a viscosity of between 2000 cp to 7000 cp at approximately 115° F. In some embodiments, fluid 104 being a vaping fluid may include propylene glycol, and/or glycerin, and/or flavorings, and/or cannabidiol oil, and/or other additives.

In some embodiments, storage and filling tank 110 may include one or more of a tank lid 112 for opening and closing tank 110, a pneumatic tank inlet 114 for connection of tank 110 with a pressurized gas, a heater 116 for heating of fluid 104 within tank 110, a level sensor 118 for determining when the level of fluid 104 decreases below a determined level, a temperature sensor 120 for determining the temperature of tank 110, and a tank outlet 122 for exit of fluid 104 from tank 110. In some embodiments, tank 110 may have a capacity of between 2 and 7 liters. In some embodiments, tank 110 may have a conical shape.

In some embodiments, tank lid 112 may be opened, such as by an operator of system 100, in order to pour fluid 104 into tank 110, followed by the closing of tank lid 112. In some embodiments, tank lid may include one or more clamps (not shown) for airtight closing of tank 110. In some embodiments, the tightness of the clamps for closing of lid 112 may be adjusted such as via thumbscrews (not shown) to enable quick and toolless refills and airtight sealings of tank 110. In some embodiments, lid 112 may include one or more rubber seals (not shown) to ensure that tank 110 is properly sealed from an ambient environment.

In some embodiments, when tank lid 112 is closed, tank lid 112 may provide an airtight seal of tank 110 such that pneumatic pressure may be applied to fluid 104 within tank 110. In some embodiments, pneumatic pressure may be applied to fluid 104 within tank 110 by providing a pressurized gas 113 into tank 110 via pneumatic inlet 114 that may be connected via tubing (not shown) to a pneumatic pump (not shown). In some embodiments, pneumatic inlet 114 may include a one-way valve to only allow a pressurized gas 113 into tank 110.

In some embodiments, the pressure applied to fluid 104 by gas 113 may force fluid 104 out of tank 110 via tank outlet 122. In some embodiments, a tank outlet 122 may be pressure regulated. In some embodiments, tank outlet 122 may include a proportional control valve (not shown) to control the fluid flow rate of fluid 104 out of tank 110 such as by varying the size of the flow passage. In some embodiments, the regulated flow rate may be used to subsequently adjust parameters affecting the flow rate, such as but not limited to applied hydraulic pressure from gas 113, the fill volume of fluid 104 in tank 110, and the fluid 104 temperature. In some embodiments, the pressure inside tank 110 may be up to 6 bar.

Figure 4:
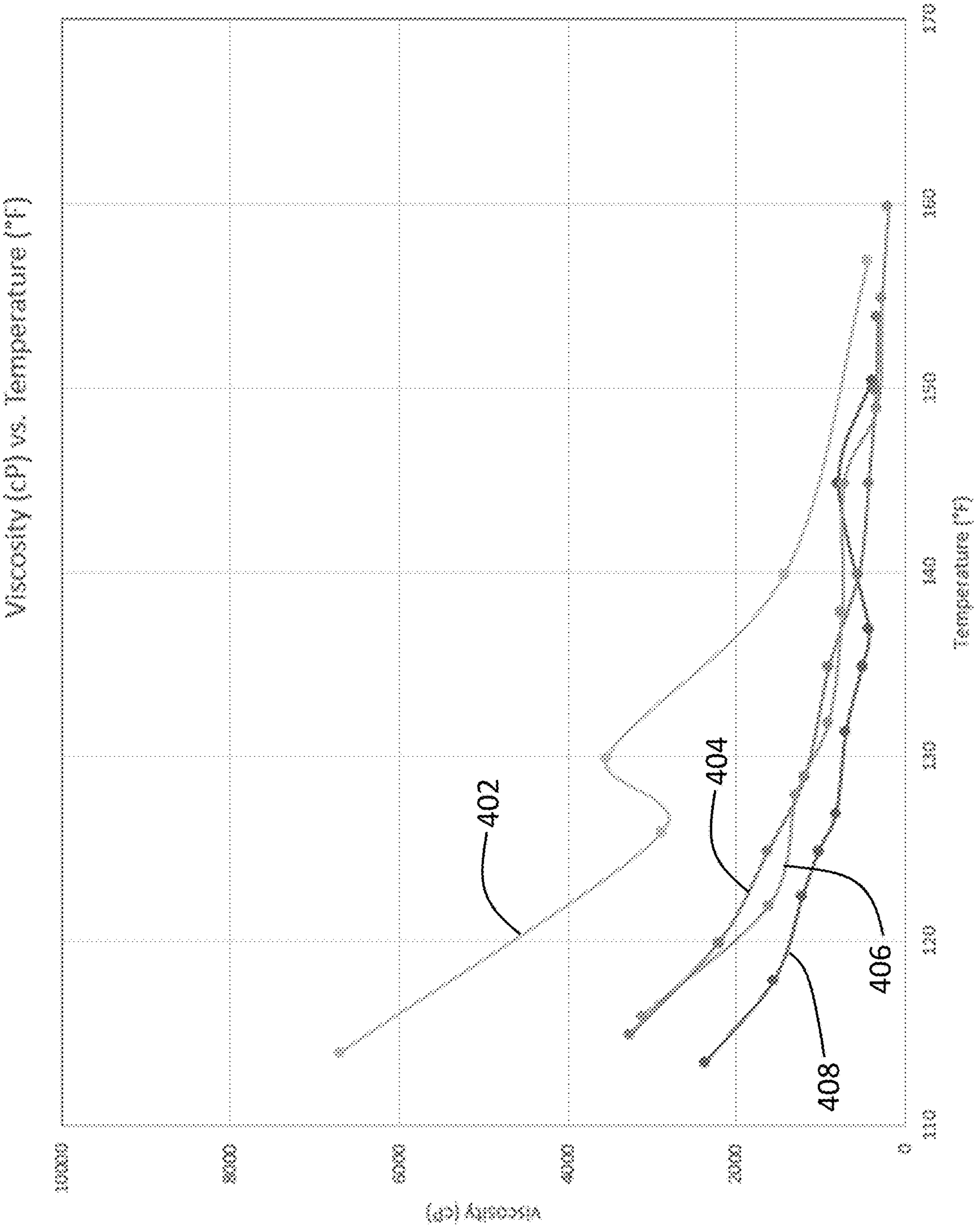
FIG. 4 is a graph showing exemplary values of viscosity (in cP) vs. temperature (in ° F.) for four variations of vaping fluids according to some implementations.

In some embodiments, heater 116 may be positioned inside tank 110 on the base of tank 110. In some embodiments, heater 116 may heat fluid 104 to a desired temperature range. Exemplary values of viscosity (in cP) vs. temperature (in ° F.) for four variations of vaping fluids are shown in FIG. 4. In some embodiments, the desired temperature range for fluid 104 may be between 120-160° F. In some embodiments, a desired viscosity of between of between 190 cp to 1500 cp may be achieved by providing a temperature range between 120-160° F. In some embodiments, heating of fluid 104 by heater 116 may reduce the viscosity by between 80%-95%. In some embodiments, up to three heaters 116 may be provided in tank 110.

In some embodiments, temperature sensor 120 may be positioned inside tank 110 on the base of tank 110. In some embodiments, temperature sensor 120 may sense the temperature of fluid 104. In some embodiments, temperature sensor 120 may sense the temperature of tank 110 (not of fluid 104).

Figure 1C:
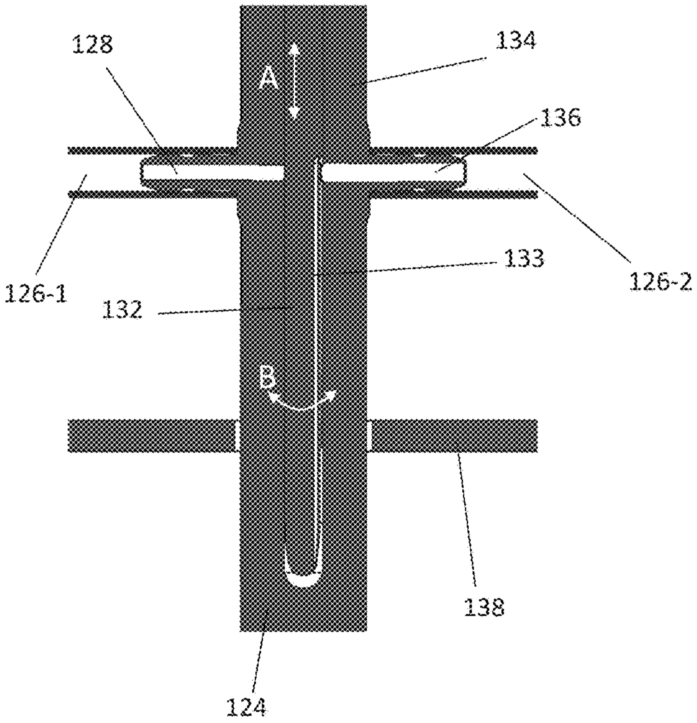
FIG. 1C shows a cutaway drawing of a pump used in a system for filling cartridges according to some implementations.
Figure 1D:
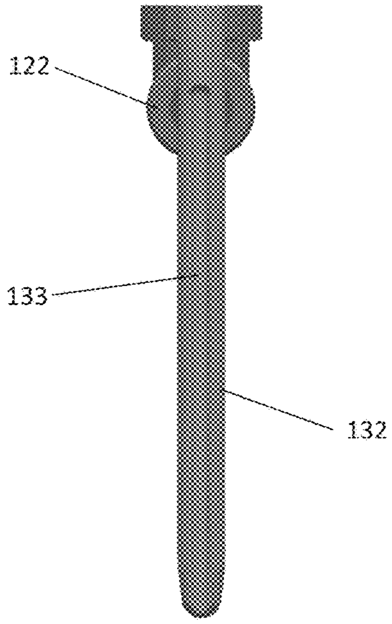
FIG. 1D is a diagram of a piston used in a pump for a system for filling cartridges according to some implementations.
Figure 1E:
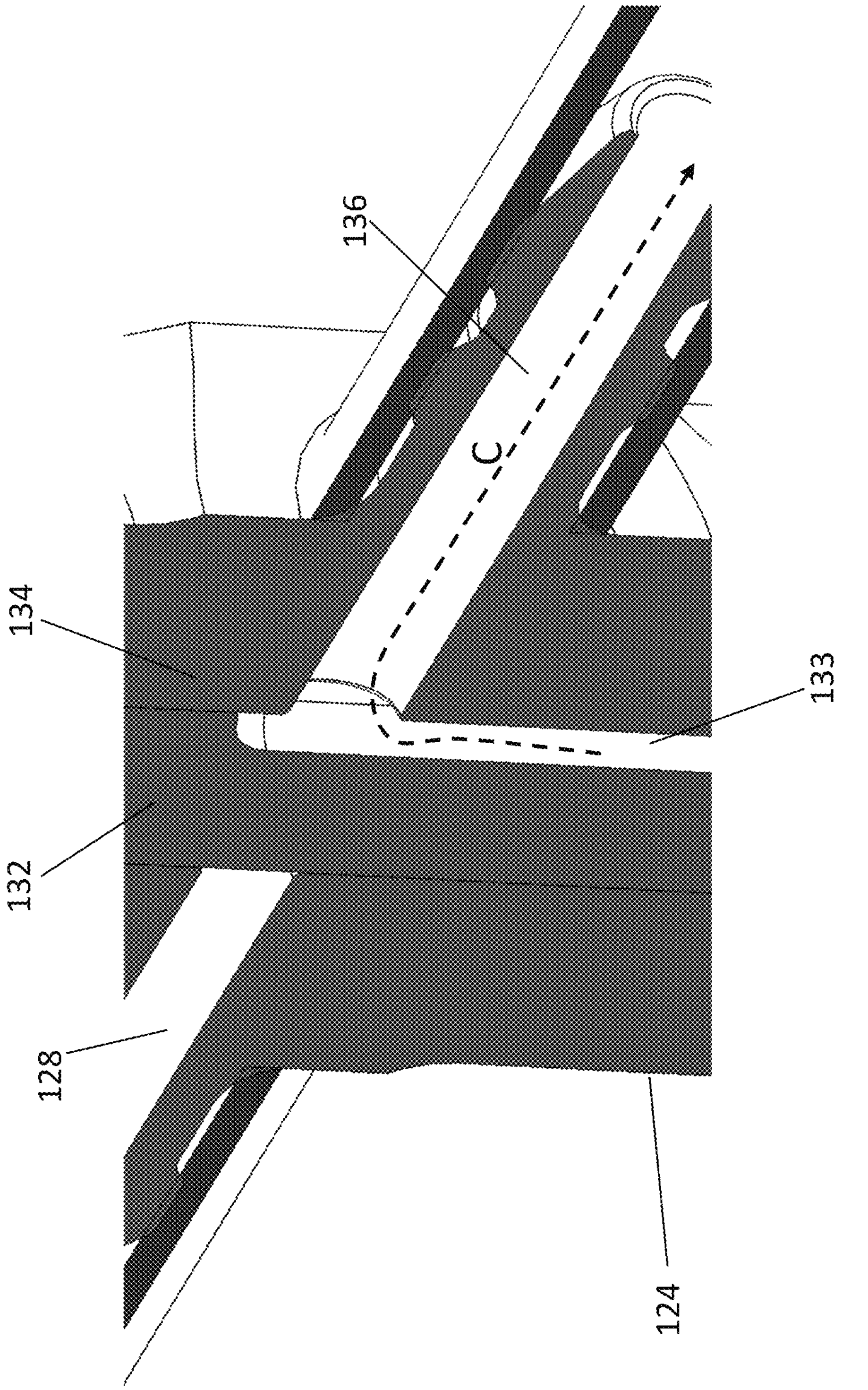
FIG. 1E shows a perspective cutaway diagram of a pump used in a system for filling cartridges according to some implementations.

Tank outlet 122 may be connected to pump 124 by tubing 126-1. Tank 110 and pump 124 are therefore in fluid communication with one another. Pump 124 is shown in more detail in FIGS. 1C-1E. FIG. 1C is a cutaway diagram of pump 124, FIG. 1D is a diagram of a piston 132 used in pump 124, and FIG. 1E is a perspective cutaway diagram of pump 124. Pump 124 may include a pump inlet port 128 that is connected by tubing 126-1 to tank outlet 122, a motor 130, piston 132, a cylinder 134, and a pump outlet port 136. Pump outlet port 136 may be connected to filling needle 140 by tubing 126-2. Pump 124 and filling needle 140 are therefore in fluid communication with one another.

In some embodiments, portions of tubing 126 and pump 124 may be encased in heating box 138 that may be heated up via a heater 139 to ensure that the temperature of the fluid 104 within pump 124 and tubing 126 is maintained at a desired range. In some embodiments, the desired temperature range or viscosity for fluid 104 in tubing 126 and pump 124 and filling needle 140 is the same as for tank 110. In some embodiments, heater 139 is a blower heater representing a cost-effective means for heating up tubing 126 as well as pump 124. In some embodiments, heating box 138 may be formed from aluminum or another metal.

In some embodiments, pump 124 may be a positive displacement pump. In some embodiments, pump 124 may be reciprocating positive displacement pump. In some embodiments, pump 124 may be a valveless piston reciprocating positive displacement pump. In some embodiments, motor 130 may include more than one motor for causing rotation and/or reciprocating motion of piston 132.

Motor 130 may cause piston 132 to reciprocate (arrow "A") and rotate (arrow "B") within cylinder 134. Piston 132 may include a notch portion 133. As piston 132 rotates (B), notch portion 133 may be alternately aligned with inlet port 128 or outlet port 136, essentially functioning as a valve. In use, piston 132 both reciprocates (A) and rotates (B) and one complete synchronous rotation and reciprocation is required for each suction (aspiration) and discharge cycle of pump 124 where greater reciprocation (piston stroke) will pump greater amounts of fluid 104 through pump 124.

During aspiration, notch portion 133 of piston 132 is oriented towards pump inlet port 128. Piston 132 may ascend for aspiration and fluid 104 will fill the void created by ascending piston 132 where the amount of fluid 104 is a determined dosage that will be pumped towards filling needle 140. Once the aspiration has been completed, piston 132 may rotate 180 degrees within cylinder 134 to orient notch portion 133 towards pump outlet port 136 and thus towards filling needle 140. For discharge of fluid 104 that is within pump 124, piston 132 may descend within cylinder 134 forcing the determined dosage of fluid 104 out of pump 124 towards filling needle 140—as shown by arrow "C" (FIG. 1E). After discharge of fluid 104, piston 132 may rotate 180 degrees to again face notch portion 133 towards pump inlet port 128 to prepare for a repeat of the pump cycle. It should be appreciated that the use of such a positive displacement pump 124 may result in repeatable and accurate dosages delivered by pump 124 towards filling needle 140 and subsequently to cartridge 102 for ensuring repeatable accurate filling of cartridge 102 with a determined measure of fluid 104.

Tubing 126-2 may be connected to filling needle 140 via a filling needle inlet port 142. Filling needle 140 may be mounted on a filling station 144. Filling station 144 may include a filling station bracket 146, a linear shaft 148, a compression spring 150, and an actuator (not shown). Linear shaft 148 may be moveably attached to filling station bracket 146. The actuator may raise and lower linear shaft 148 and attached filling needle 140 in a movement shown by arrow "D".

Figure 1F:
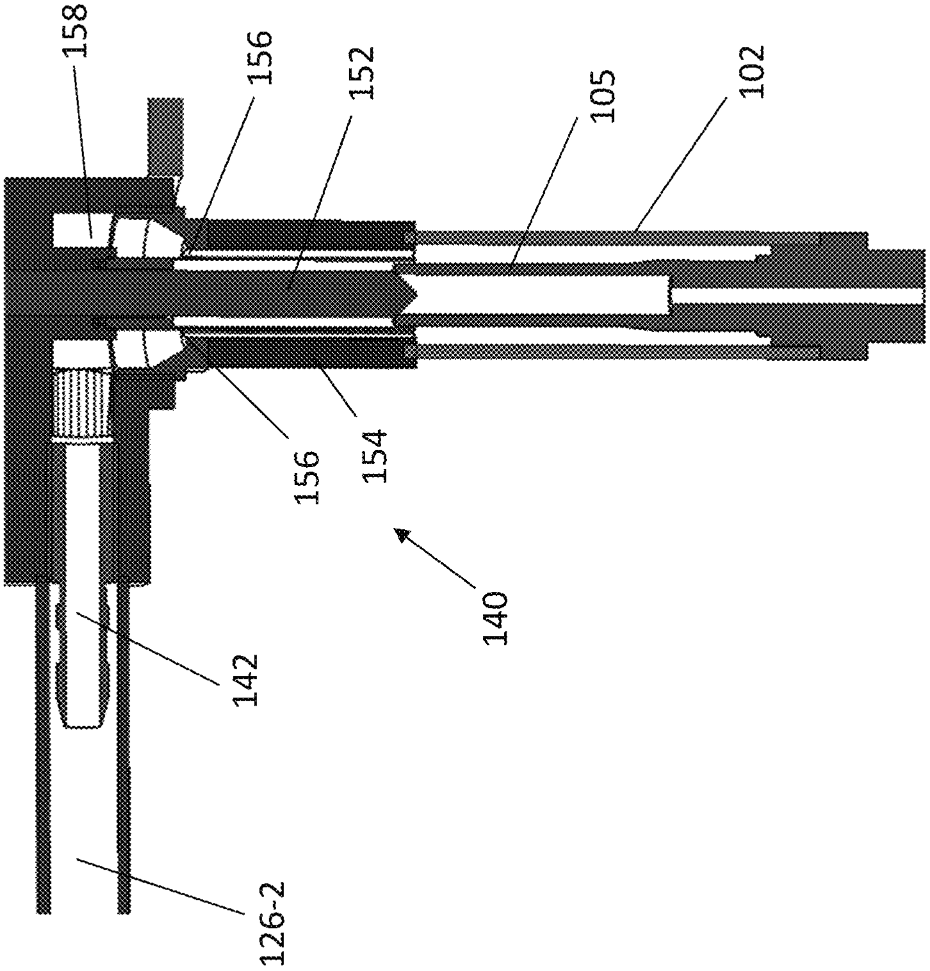
FIGS. 1F and 1G show detailed cutaway drawings of a filling needle used in a system for filling cartridges according to some implementations.
Figure 1H:
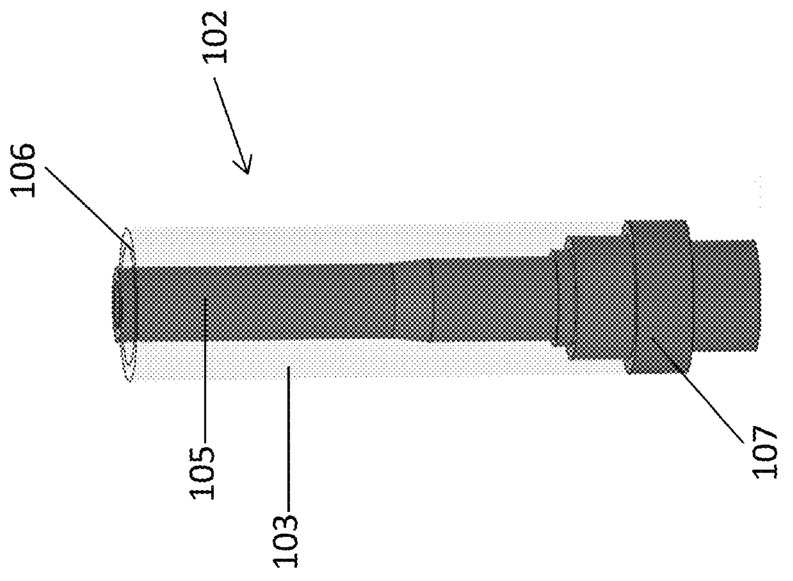
FIG. 1H shows a drawing of a cartridge ready for filling according to some implementations.
Figure 1G:
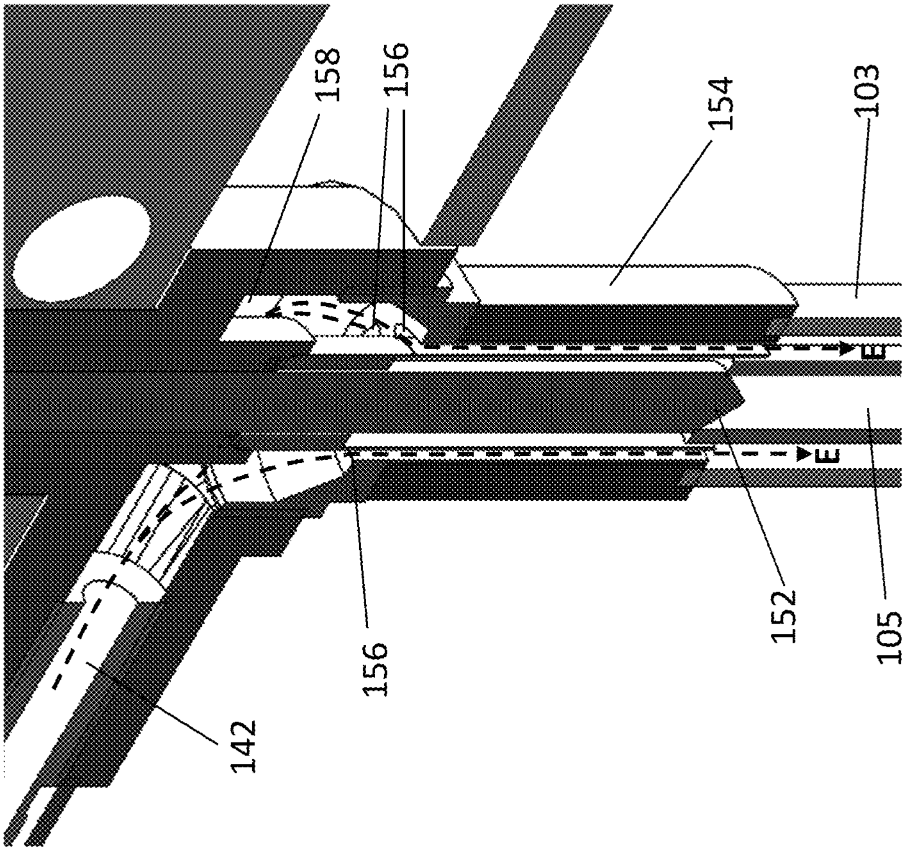

FIGS. 1F and 1G show detailed cutaway drawings of filling needle 104. Filling needle 140 may include a needle alignment shaft 152, outer seal 154, fill needle dispensing outlets 156 and filling needle interior volume 158. Linear shaft 148 may be fixedly attached to needle alignment shaft 152 and may move vertically within filling needle 140.

FIG. 1H shows cartridge 102 ready for filling. Cartridge 102 may include a casing 103 that may be substantially transparent as shown, a hollow substantially cylindrical center post 105, a filling opening 106, and a base seal 107.

In use, on a downward stroke linear shaft 148 may drive filling needle 140 into cartridge 102 so that a releasable seal is achieved between filling needle 102 and cartridge 104. In some embodiments, needle alignment shaft 152 may be sized so that a tip of needle alignment haft 152 may substantially fit into the hollow inner portion of center post 105 to thereby engage with center post 105 to align and guide filling needle 102 onto cartridge 104. In some embodiments, needle alignment shaft 152 may be relatively free moving within filling needle 140 and will move upwards when facing resistance (i.e., after not correctly aligning and hitting a side of center post 105 of cartridge 102). Compression spring 150 may provide resistance to support a smoother insertion of needle alignment shaft 152 into center post 105. When filling needle 140 is pushed against cartridge 102, outer seal 154 may engage with cartridge casing 103 to create a releasable seal with cartridge filling opening 106 to prevent leakage of fluid 104 when fluid 104 is injected into cartridge 102.

Once cartridge 102 is engaged with filling needle 140, pump 124 may discharge, forcing fluid 104 through tubing 126-2, into filling needle inlet port 142, through filling needle interior volume 158, and through needle dispensing outlets 156 into cartridge filling opening 106 of cartridge 102 as shown by arrows "E" (FIG. 1G). Advantageously, needle dispensing outlets 156 may be kidney-shaped and positioned around a circumference of needle alignment shaft 152 in order to evenly distribute fluid 104 between the walls of casing 103 and center post 105 as fluid 104 is injected into cartridge 102 to thereby prevent fluid 104 from accumulating on one side of cartridge 102. In some embodiments, four needle dispensing outlets 156 are spaced evenly around a circumference of needle alignment shaft 152. Once cartridge 102 has been filled, filling needle 140 may retract and cartridge filling opening 106 may then be closed such as with a cap (not shown). In some embodiments, filling needle 140 may include a temperature sensor (not shown) for sensing the output temperature of fluid 104 as it is injected into cartridge 102.

Controller 160 may be a computing device as defined herein. In some embodiments, controller 160 may be a programmable logic controller (PLC). Controller 160 may manage the operation of the components of system 100 and may direct the flow of data between the components of system 100. Where system 100 may be said herein to provide specific functionality or perform actions or processes, it should be understood that the functionality or actions are performed by controller 160 that may perform the functionality or actions or may call on other components of system 100 for performing functionality or actions. Controller 160 and the modules and components that are included in system 100 may include a non-transitory computer readable medium containing instructions that when executed by at least one processor are configured to perform the functions and/or operations necessary to provide the functionality described herein.

HMI 162 may provide for interaction of a user, such as an operator of system 100, with controller 160 and other components of system 100 and for this purpose may include a display for displaying information to the user and an input device such as a touchscreen or a keyboard and a pointing device or individual buttons/knobs/levers by which the user can provide input to computing device. In some embodiments, HMI 162 may receive input from a user in any form, including acoustic, speech, analysis of user head position and/or eye movements, or tactile input.

In some embodiments, controller 160 may be in data communication with one or more of heater 116, tank level sensor 118, temperature sensor 120, a proportional control valve in tank outlet 122, pump 124, heating box 138, blower heater 139, a filling station actuator, sensors (not shown for determining the position of filling needle 140 and the successful engagement of filling needle 140 with cartridge 102. In some embodiments, controller may be in data communication with a pneumatic pressure system connected via pneumatic inlet 114 such as a pneumatic pump (not shown).

In some embodiments, temperature sensor 120 and heater 116 may be respectively monitored and controlled by controller 160 linked via a feedback loop in order to keep tank 110 within a desired temperature range. In some embodiments, the desired temperature of tank 110 may be set via HMI 162. In some embodiments, the volume of fluid 104 to be injected into cartridge 102 may be set via HMI 162. In some embodiments, the flow rate out of tank outlet 122 may be monitored and adjusted and used to subsequently adjust parameters affecting the flow rate such as but not limited to applied hydraulic pressure from gas 113, the fill volume of fluid 104 in tank 110, and the fluid 104 temperature.

In some embodiments, when the level of fluid 104 in tank 110 is determined by level sensor 118 to have decreased below a determined level, a low fluid level alarm may be triggered via controller 160 to alert an operator to refill tank 110 with fluid 104. In some embodiments, the low fluid level alarm may cause outlet port 122 to stop the flow of fluid 104. In some embodiments, the low fluid level alarm may be provided via HMI 162. In some embodiments, an operator may interact with HMI 162 to override the fluid low level stop in order to cause tank 110 to be fully emptied.

In some embodiments, the volume aspirated and subsequently dispensed by pump 124 may be set using HMI 162 and may correspond to a reciprocation height that piston 132 travels during aspiration. In some embodiments, controller 160 may determine that no cartridge 102 was engaged by filling needle 140 and may prevent pump 124 from discharging.

In some embodiments, filling station 144 may include multiple filling needles 140 each with a respective associated actuator, linear shaft 148, and compression spring 150. In some embodiments, each one of a plurality of pumps 124 may be connected to one of multiple filling needles 140.

Figure 2A:
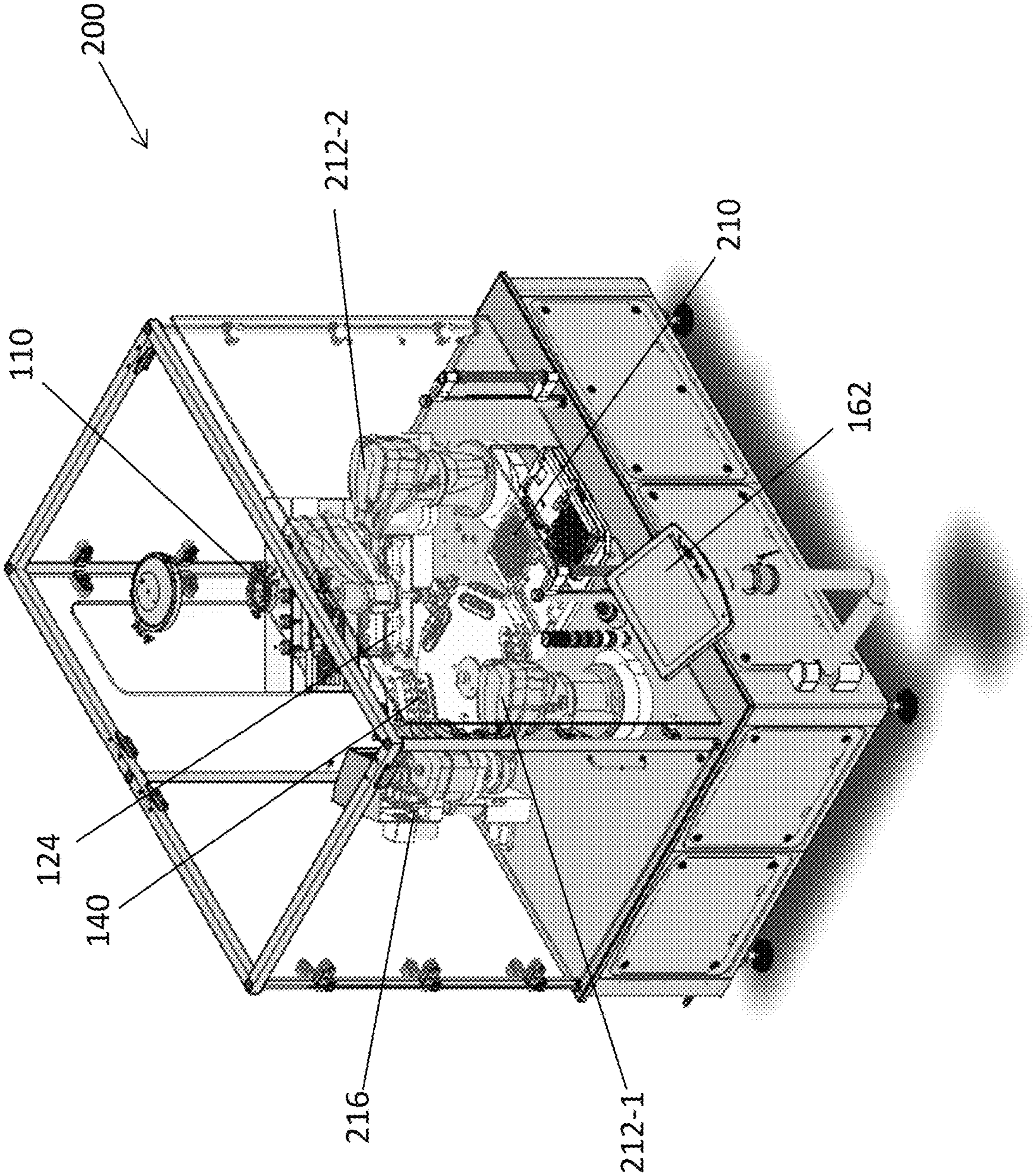
FIGS. 2A-2C show drawings of a system 200 for loading, filling, and capping cartridges according to some implementations.
Figure 2B:
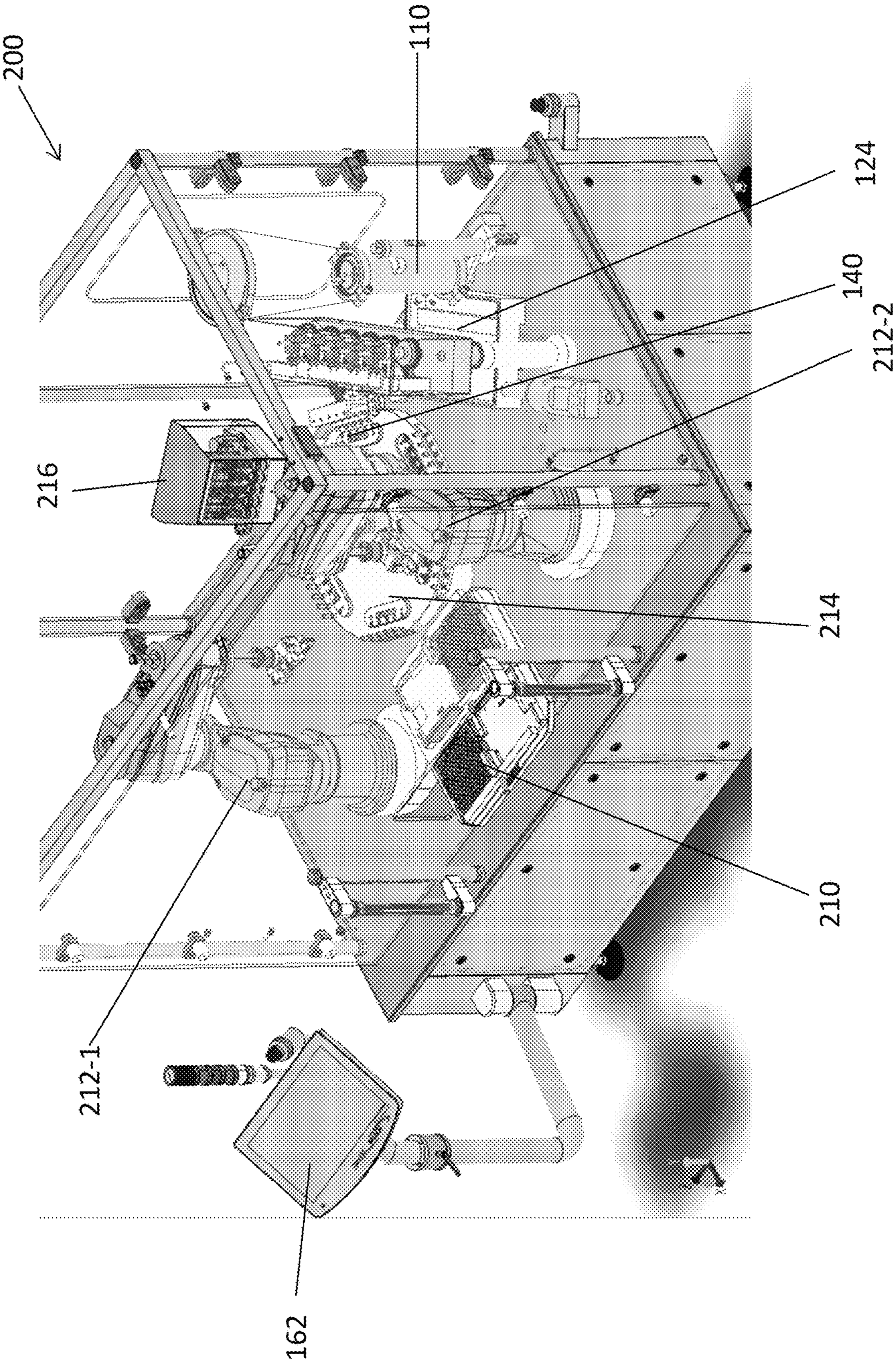
Figure 2C:
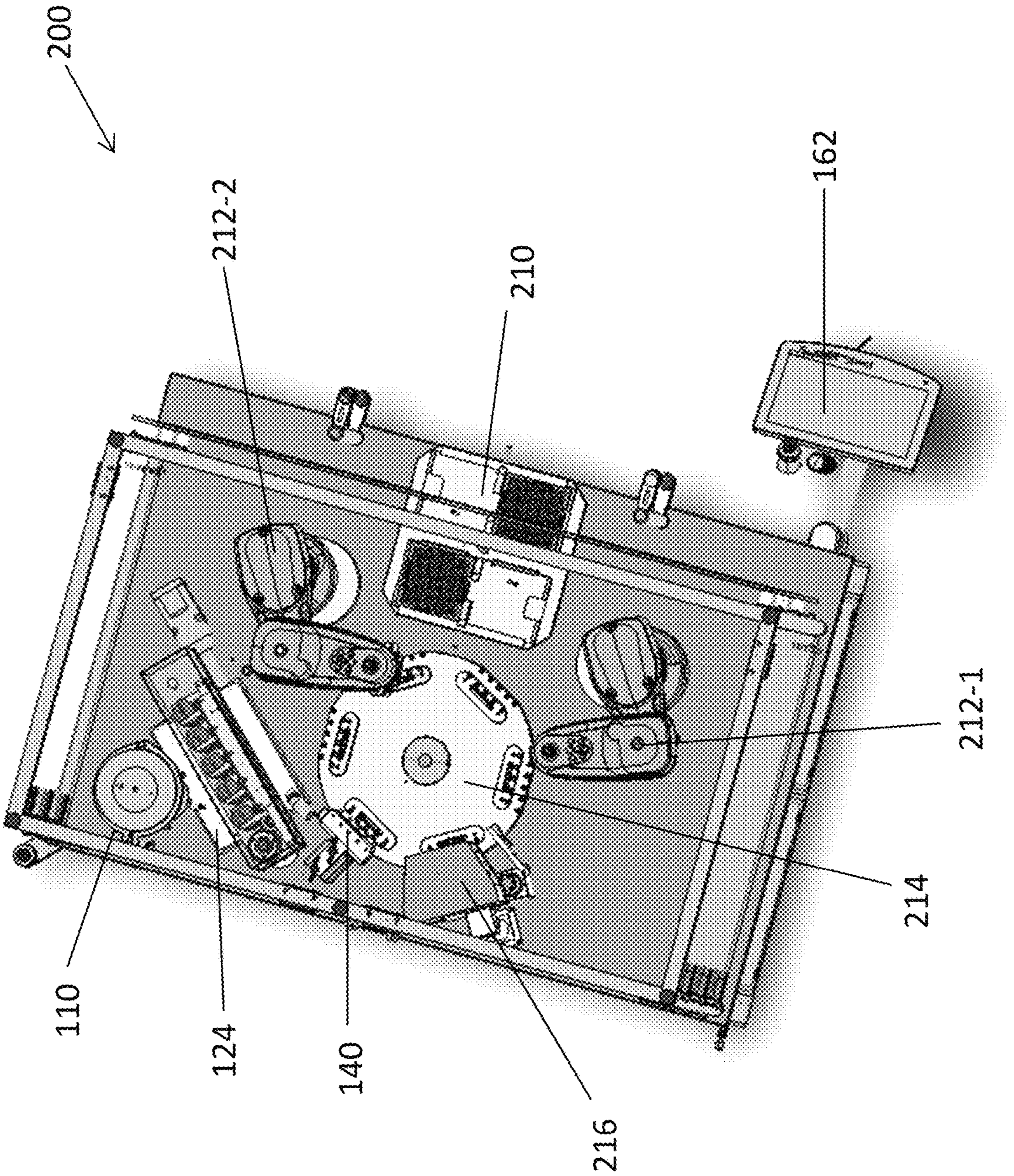

FIGS. 2A-2C illustrate a system 200 for loading, filling, and capping cartridges according to some implementations. FIGS. 2A-2C do not show tubing such as tubing 126 in order to simplify the drawings. System 200 may use system 100 for filling cartridges 102 with fluid 104. In some embodiments, such as shown in FIGS. 2A-2C, system 100 is provided with five pumps 124 and five connected filling needles 140 for simultaneous filling of up to five cartridges 102. System 200 may further include one or more of the following components:

- a tray bay 210 for providing trays filled with empty cartridges 102 and separate caps, as well as for receiving trays filled with cartridges 102 that have been filled and capped by system 200;
- a star wheel 214 configured to rotate the cartridges, caps, filled cartridges, and capped cartridges in order for them to be manipulated at various stations around star wheel 214 such as filling station 144 and capping station 216;
- robot arms 212-1 and 212-2 configured to pick and place cartridges and caps from tray bay 210 into star wheel 214. Robot arms 212-1 and 212-2 may further be configured to pick and place filled and capped cartridges from star wheel 214 into tray bay 210; and
- capping station 216 that may remove caps from star wheel 214, receive filled cartridges from star wheel 214 and close cartridge filling opening 106 with a cap.

Controller 160 may be in data communication with and may control the components of system 200. HMI 162 may be configured for configuring and operating system 200.

Figure 3:
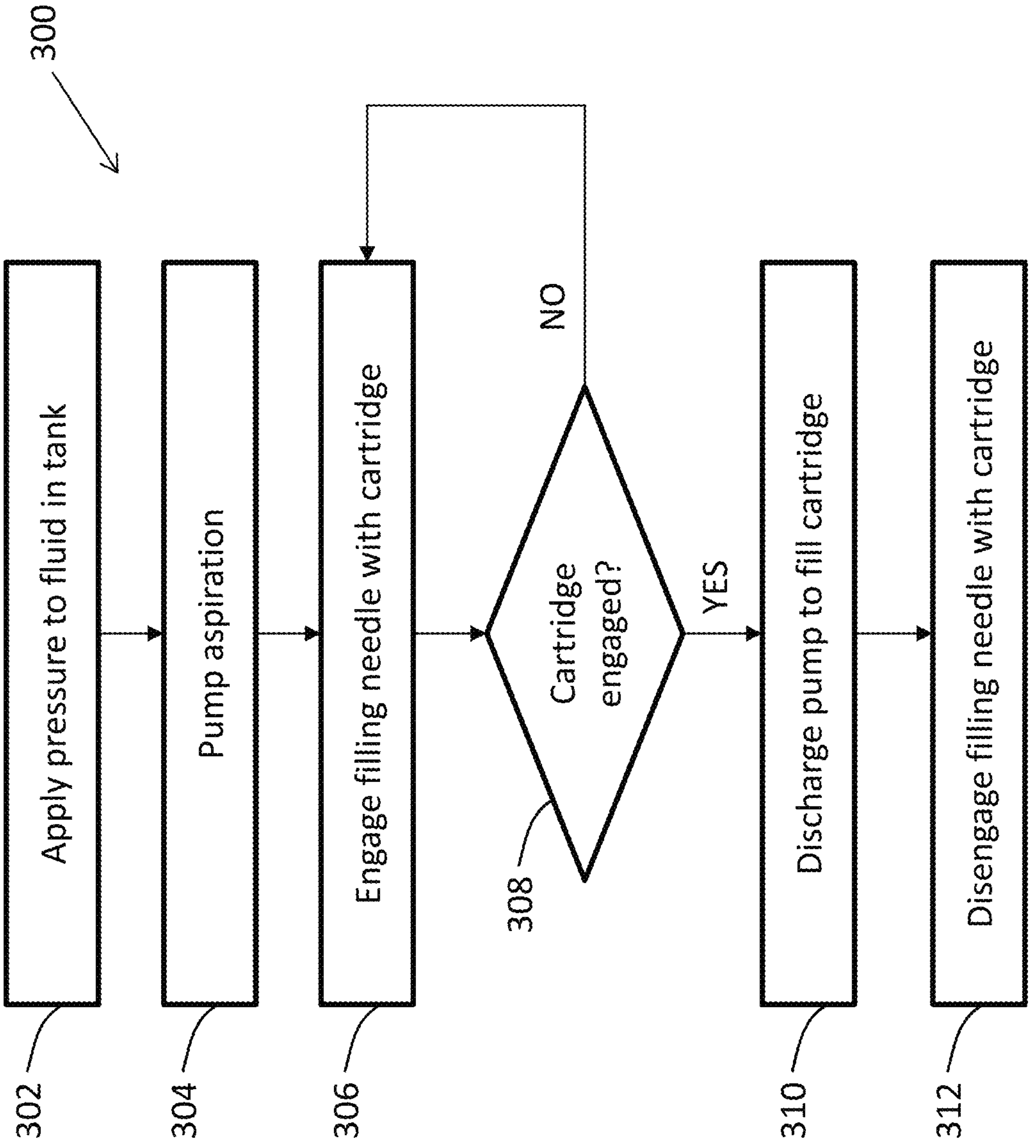
FIG. 3 illustrates a flow chart of a process for filling cartridges with a fluid according to some implementations.

FIG. 3 illustrates a flow chart of a process 300 for filling cartridges with a fluid according to some implementations. Process 300 may be performed by system 100 or system 200 as described above. A non-transitory computer readable medium may contain instructions that when executed by at least one processor performs the operations described at each of the steps in process 300. The non-transitory computer readable medium and at least one processor may correspond to controller 160 and/or other components of system 100 or system 200.

In a preliminary step, tank 110 may be filled or partially filled with fluid 104 and then closed. In step 302, pneumatic pressure may be applied to fluid 104 inside tank 110. In step 304, pump 124 may aspirate, filling pump 124 with a desired volume of fluid 104.

In step 306, filling needle 140 may engage with cartridge 102. In some embodiments, step 306 may take place substantially simultaneously with step 304. In an optional step 308, controller 160 may determine whether cartridge 102 has been successfully engaged with filling needle 140 where successful engagement may be defined as outer seal 154 engaging with cartridge casing 103 to seal cartridge filling opening 106. If it is determined that cartridge 102 has not been successfully engaged, then step 306 may be repeated to attempt to properly engage cartridge 102 (or a subsequent cartridge 102).

If it is determined that cartridge 102 has been successfully engaged, then in step 310, pump 124 may discharge to thereby fill cartridge with a desired volume of fluid 104. Once cartridge 104 has been filled, in step 312, cartridge may be disengaged from filling needle 140. In a subsequent step cartridge 102 may be capped to seal cartridge filling opening 106.

FIG. 4 is a graph showing exemplary values of viscosity (in cP) vs. temperature (in ° F.) for four variations (402, 404, 408, 410) of vaping fluids (collectively referred to as fluid 104) according to some implementations. The tested vaping fluid variations may include 80% THC distillate mixed with 20% solid coconut oil (line 402), or mixed with 20% MCT (medium-chain triglyceride) oil (lines 404 and 406), or mixed with 17% MCT oil and 3% terpenes (line 408). It should be appreciated that alternative formulations of fluid 104 are contemplated and the above formulations are exemplary.

As shown fluid 104 may have a viscosity of between 2000 cp to 7000 cp at approximately 115° F. In some embodiments, a desired viscosity of between of between 190 cp to 1500 cp may be achieved with a temperature range between 120-160° F. In some embodiments, heating of fluid 104 by heater 116 may reduce the viscosity by between 80%-95%. It should be appreciated that reducing the viscosity by heating of fluid 104 may ease the pumping of fluid 104 through system 100 including rapid injection of heated fluid 104 into cartridge 102.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a processor chip or a circuit. As software or algorithm, selected steps of the disclosure could be implemented as a plurality of software instructions being executed by a computer/processor using any suitable operating system. In any case, selected steps of the method and system of the disclosure could be described as being performed by a data processor, such as a computing device for executing a plurality of instructions.

Various implementations of the systems and techniques described here can be realized in digital electronic circuitry, integrated circuitry, specially designed ASIC s (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computing device having a display (indicator/monitor/screen/array) (such as a LED (light-emitting diode), OLED (organic LED), LCD (liquid crystal display) or other display technology) for displaying information to the user and a keyboard and a pointing device (e.g., a mouse, joystick or a trackball) or individual buttons/knobs/levers (such as driving wheel buttons/signaling levers) by which the user can provide input to the computing device. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, analysis of user head position and/or eye movements, or tactile input.

It should be appreciated that the above-described methods and apparatus may be varied in many ways, including omitting, or adding steps, changing the order of steps and the type of devices used. It should be appreciated that different features may be combined in different ways. In particular, not all the features shown above in a particular embodiment or implementation are necessary in every embodiment or implementation of the disclosure. Further combinations of the above features and implementations are also considered to be within the scope of some embodiments or implementations of the disclosure.

While certain features of the described implementations have been illustrated as described herein, many modifications, substitutions, changes, and equivalents will now occur to those skilled in the art. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations and embodiments described.

What is claimed is:

1. A cartridge filling system, comrpising:

a tank configured to store a fluid;

a pump in fluid communication with the tank; and a filling needle in fluid communication with the pump and configured to form a releasable seal to a cartridge, wherein the cartridge includes a center post that is hollow and the filling needle includes a needle alignment shaft configured to fit into the center post to thereby align the filling needle with the cartridge, wherein the pump is configured to pump measured doses of the fluid received from the tank through the filing needle into the cartridge, and wherein the pump is a positive displacement pump.

2. The system of claim 1, wherein the fluid is a vaping fluid and the cartridge is a vaping cartridge.

3. The system of claim 1, wherein the tank includes a heater configured to heat the fluid inside the tank to a desired temperature range and/or desired viscosity.

4. The system of claim 3, wherein the desired temperature range is between 120 and 160° F.

5. The system of claim 3, wherein the tank includes a temperature sensor positioned so as to sense the temperature of the fluid.

6. The system of claim 3, wherein the tank includes a temperature sensor positioned so as to sense the temperature of the tank.

7. The system of claim 3, wherein the heating by the heater reduces the viscosity of the fluid by between 80%-95%.

8. The system of claim 1, wherein the tank is configured to apply pneumatic pressure to the fluid inside the tank to thereby force the fluid out of the tank.

9. The system of claim 1, wherein the tank includes a level sensor configured to sense when the fluid in the tank drops below a defined level.

10. The system of claim 1, wherein a portion of the pump and tubing connected to the pump is enclosed within a heating box that is configured to maintain the temperature of the fluid within the pump and the tubing at a desired range.

11. The system of claim 10, wherein the desired temperature range is between 120 and 160° F.

12. The system of claim 10, wherein the heating box includes a metal box and a blower heater.

13. The system of claim 1, wherein the positive displacement pump is a reciprocating positive displacement pump.

14. The system of claim 1, wherein the positive displacement pump is a valveless piston reciprocating positive displacement pump.

15. The system of claim 1, wherein the pump includes a piston having a notch portion that is alternately aligned with an inlet port or outlet port of the pump.

16. The system of claim 1, wherein the filling needle is mounted on a linear shaft configured to drive the filling needle into the cartridge so that a seal is achieved between the filling needle and the cartridge.

17. The system of claim 1, wherein the filling needle includes an outer seal configured to engage with the cartridge to thereby seal the cartridge for when the fluid is injected into the cartridge.

18. The system of claim 1, wherein the filling needle includes needle dispensing outlets positioned around a circumference of the needle alignment shaft such that the fluid injected into the cartridge through the needle dispensing outlets is evenly distributed around the cartridge.

19. The system of claim 1, further including a controller configured to operate the system.

20. The system of claim 19, further including a human machine interface for interaction of a user with the controller.

21. The system of claim 1, further including a lid attachment robot configured to attach lids onto cartridges that have been filled with fluid.

22. The system of claim 21, further including a tray bay configured to hold trays filled with empty cartridges, caps, and cartridges that have been filled and capped.

23. The system of claim 22, further including a star wheel configured to move trays of empty cartridges, caps, filled cartridges and cartridges that have been filled and capped.

24. The system of claim 23, further including a robot arm configured to pick and place empty cartridges and caps from the tray bay into the star wheel and cartridges that have been filled and capped from the star wheel into the tray bay.

25. A method for filling a cartridge, comprising:

providing a cartridge filling system including a tank configured to store a fluid, a pump in fluid communication with the tank, and a filling needle in fluid communication with the pump and configured to form a releasable seal to a cartridge, wherein the pump is a positive displacement pump;

causing the filling needle to engage with a cartridge; and activating the pump to pump a measured dose of the fluid received from the tank through the filing needle into the cartridge, wherein the cartridge includes a center post that is hollow and the filling needle includes a needle alignment shaft configured to fit into the center post to thereby align the filling needle with the cartridge.

26. The method of claim 25, wherein the fluid is a vaping fluid and the cartridge is a vaping cartridge.

27. The method of claim 25, further including heating the fluid in the tank and in the pump to a desired temperature range and/or desired viscosity.

28. The method of claim 27, wherein the desired temperature range is between 120 and 160° F.

29. The method of claim 27, wherein the heating reduces the viscosity of the fluid by between 80%-95%.

30. The method of claim 27, wherein the cartridge filling system further includes a controller configured to operate the cartridge filling system, and a human machine interface (HMI) for interaction of a user with the controller, and wherein the method further includes interacting with the HMI to set the desired temperature range and/or desired viscosity and/or a volume of the measured dose of fluid to be injected into the cartridge and/or a flow rate of fluid out of the tank.

31. The method of claim 25, further including applying pneumatic pressure to the fluid inside the tank to thereby force the fluid out of the tank.

* * * * *